United States Patent [19]

Ludwig et al.

[11] Patent Number: 4,738,904
[45] Date of Patent: Apr. 19, 1988

[54] LOW TEMPERATURE THERMOELECTROCHEMICAL SYSTEM AND METHOD

[75] Inventors: Frank A. Ludwig, Rancho Palos Verdes; Carl W. Townsend, Los Angeles; Chilengi P. Madhusudhan, Torrance, all of Calif.

[73] Assignee: Hughes Aircraft Company, Los Angeles, Calif.

[21] Appl. No.: 919,294

[22] Filed: Oct. 14, 1986

[51] Int. Cl.[4] ............................................. H01M 8/06
[52] U.S. Cl. ........................................ 429/17; 429/20
[58] Field of Search .................... 429/17, 20, 26, 30

[56] References Cited

U.S. PATENT DOCUMENTS

| | | | |
|---|---|---|---|
| 3,013,098 | 12/1961 | Hunger et al. | 429/30 |
| 3,236,691 | 2/1966 | Reger et al. | 429/17 |
| 3,432,356 | 3/1969 | Christianson | 429/26 |
| 4,292,378 | 9/1981 | Krumpelt et al. | 429/20 |
| 4,410,606 | 10/1983 | Loutfy et al. | 429/17 |

Primary Examiner—Donald L. Walton
Attorney, Agent, or Firm—Mary E. Lachman; A. W. Karambelas

[57] ABSTRACT

A thermoelectrochemical system in which a continuous electrical current is generated from a heat input below about 250° C. A hydrogen ion reacting cathode is immersed in a chosen Bronsted acid and a hydrogen ion reacting anode is immersed in a chosen Bronsted base. Reactants consumed at the electrodes during the electrochemical reaction are directly regenerated thermally below about 250° C. and recycled to the electrodes to provide continuous operation of the system.

44 Claims, 4 Drawing Sheets

LOW TEMPERATURE THERMOELECTROCHEMICAL SYSTEM AND METHOD

BACKGROUND OF THE INVENTION

1. Field of the Invention

The present invention relates generally to thermoelectric batteries which convert thermal energy directly into electrical energy by use of a continuous concentration electrochemical cell. More specifically, the present invention relates to an improved thermoelectric battery based on the generation of an electric current utilizing a hydrogen ion concentration gradient.

2. Description of the Background Art

U.S. Pat. No. 3,231,426, issued Jan. 25, 1966, discloses a continuous concentration cell in which a voltage is obtained and an electric current is generated between a cathode immersed in concentrated sulfuric acid and an anode immersed in dilute sulfuric acid. The reaction cycle which is set up between the electrodes is:

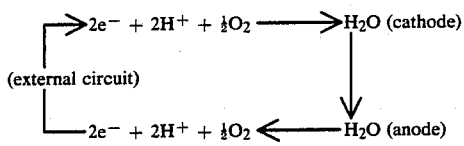

During operation of the cell, the concentrated sulfuric acid solution is diluted by water generated at the cathode, while the dilute sulfuric acid solution becomes more concentrated due to the generation of acid at the anode. The difference in acid concentration between the two solutions must be maintained in order to provide continuous generation of electrical energy. The system disclosed in U.S. Pat. No. 3,231,426 maintains the acid concentration gradient by heating the concentrated acid solution to distill off water generated at the cathode. The water which is continuously distilled from the concentrated acid solution is cycled to the dilute acid solution to continually provide dilution of the acid which is generated at the anode. The above-described system accomplishes its intended purpose. However, during operation of the cell, large amounts of water must be continually distilled from the concentrated acid solution, recondensed and then cycled to the dilute acid solution. This distillation process is not energy efficient and requires additional equipment to handle the copious amounts of water which must be distilled and circulated during operation of the system.

The system described in patent application Ser. No. 788,999, assigned to the present assignee, improves upon the system disclosed in U.S. Pat. No. 3,231,426 by providing a system in which a sodium sulfate buffer is utilized to generate electric energy without requiring the energy inefficient distillation and circulation of relatively large amounts of water. In this improved system, a buffered solution containing sodium sulfate and sodium bisulfate is substituted for the dilute acid anode solution in the previous sulfuric acid concentration cell. Use of this buffered solution instead of dilute acid allows the generation of electric energy without requiring distillation and recirculation of large amounts of water.

During operation of this improved system, sodium bisulfate is generated at the anode and sodium sulfate is consumed. In addition, the sodium bisulfate is thermally converted to sodium sulfate, water, and sulfur trioxide. The sodium sulfate and water are recycled to the anode solution to replenish sodium sulfate which is consumed. The sulfur trioxide is recycled to the concentrated sulfuric acid (cathode) solution where it combines with water generated or collected at the cathode to form sulfuric acid. This continual thermal conversion of sodium bisulfate provides continual replacement of the sodium sulfate and sulfuric acid consumed during operation of the system.

While useful for its intended purpose, the above-described buffered sulfuric acid system requires a temperature of 450° C. in order to thermally regenerate the electrochemical cell reactants. This relatively high temperature makes such a system unsuitable for low temperature uses where the highest temperature available is about 250° C. or less, such as in an energy-efficient system which can use waste heat from an external system as the heat input for the above-described thermal regeneration process. A particular application of such a system is for the generation of electricity from the waste heat from an internal combustion engine. It is projected that the electric power requirements for automobiles or trucks will increase by as much as a factor of ten, from 500 watts presently to 5 kilowatts. The use of three 50 volt alternators to supply this power would reduce the fuel economy by 30 to 50 percent and would decrease the acceleration of the vehicle. Consequently, a need exists in the automotive industry for a system which can produce electrical energy from the waste heat of an internal combustion engine, at high efficiency and high power density by direct conversion of heat to electricity.

Another area where only relatively low temperatures (below about 250° C.) are available for thermal regeneration of reactants in batteries similar to those previously described is in undersea applications, where subterranean heat sources are within the range of 80° to 150° C. (176° to 302° F). A need exists for the development of an undersea power source which can be used, for example, in undersea oil recovery to control valves in oil wells located on the sea floor to permit the delivery of oil from the sea floor to the surface. Presently, these valves are controlled from ground equipment by cables approximately 8 to 20 miles long, which extend from land to the sea floor and consist of electrical conductors and hydraulic fluid conductors. However, these cables frequently are damaged by subsea landslides or fishnets, and the oil delivery system must be periodically shut off in order to repair or replace the damaged cables. Consequently, substantial savings could be realized if these cables and associated ground equipment could be replaced by an undersea power source to provide power to a microprocessor which could control the undersea oil well valves. Thus, a need exists for an undersea power source which has heretofore been unavailable.

Further need exists in industrial environments where the ability to use low grade waste heat from industrial processes to generate electricity would significantly reduce cost.

The present invention is directed to meeting the need for a power converter to generate electrical energy from thermal energy at a relatively low temperature and at high efficiency and high power density.

SUMMARY OF THE INVENTION

In accordance with the present invention, a system and method are provided as a low-temperature power converter in which the electrochemical cell reactants are thermally regenerated at a temperature below about 250° C.

The thermoelectrochemical system in accordance with the present invention basically includes an electrochemical cell having a cathode compartment and an anode compartment. The two compartments have a common ion permeable separation wall. A hydrogen ion reacting cathode and a hydrogen ion reacting anode are located within their respective compartments with the cathode and anode being connectable externally from the system for generation of an electrical voltage and current between the electrodes.

A cathode fluid comprising a chosen Bronsted acid is located in the cathode compartment and in contact with the cathode. During operation of the system, hydrogen gas or water is generated or collected at the cathode and the acid is consumed. The system further includes an anode fluid comprising a chosen Bronsted base which is located in the anode compartment and in contact with the anode. During operation of the system, a cation of the base is generated and the base and hydrogen or water are consumed at the anode. At least one of the components, i.e., acid or base comprises an organic material. Means are provided for transferring any hydrogen gas generated at the cathode to the anode compartment for consumption at the anode during generation of the electrical current. In addition, during operation of the system, the anions of the acid and/or the cations of the base migrate through the ion permeable separation wall into the anode or cathode compartment, respectively, where they combine with the cation of the base or the anion of the acid to form the corresponding salt, which is capable of being thermally decomposed at a temperature below about 250° C. to directly form the acid and base as two decomposition products, which can be separated to regenerate the acid and base.

A thermal regenerator is provided for thermally converting the salt directly to the acid and base starting materials, at a temperature below about 250° C. Means for transferring the salt from the anode and/or cathode compartment to the thermal regenerator means are also provided. Anode recycle means are provided for transferring the base formed in the thermal regenerator back to the anode compartment to replenish the base consumed during operation of the system. Cathode recycle means are also provided for transferring the acid formed in the thermal regenerator back to the cathode compartment to replenish the acid consumed during operation of the system.

The system and method in accordance with the present invention provides a continuous thermoelectrochemical cell which is capable of operating at temperatures below about 250° C.

Accordingly, it is a purpose of the present invention to provide a thermoelectrochemical system and method which is capable of generating electrical power at low temperatures, such as below about 250° C.

Another purpose of the present invention is to provide a thermoelectrochemical system and method of the type described above, in which the heat for the regeneration of the electrochemical cell reactants is provided by the waste heat from an internal combustion engine.

Still another purpose of the present invention is to provide a thermoelectrochemical system and method of the type described above in which the heat for the regeneration of the electrochemical cell reactants is provided by the heat from an oil well head or other geothermal heat source.

Another purpose of the present invention is to provide electric power from waste heat.

Yet another purpose of the present invention is to provide an electrochemical cell for producing an electrochemical reaction between a gaseous reactant and a liquid reactant.

These and many other features and attendant advantages of the present invention will become apparent as the invention becomes better understood by reference to the following detailed description when considered in conjunction with the accompanying drawings.

DETAILED DESCRIPTION OF THE INVENTION

Figure 1:
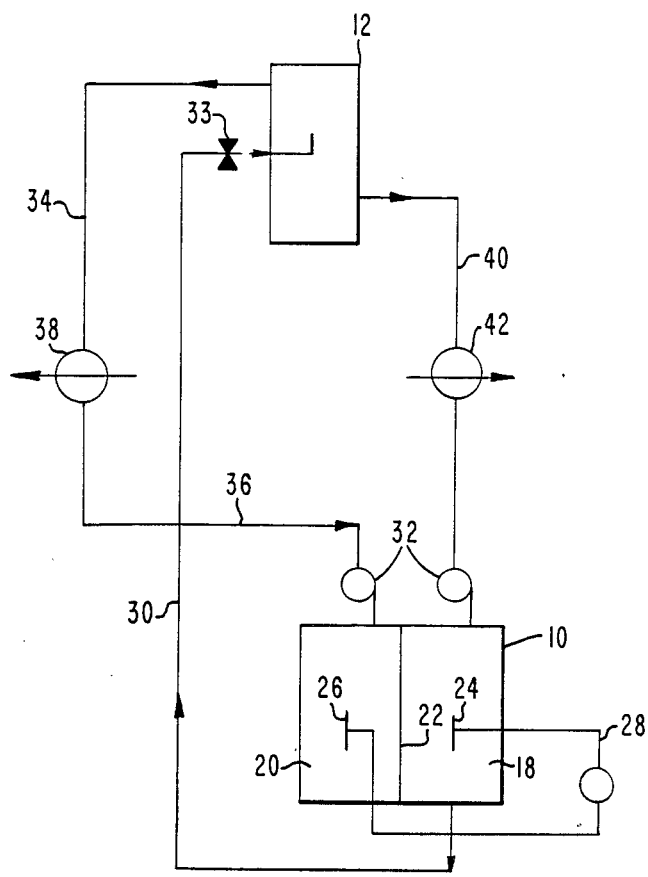
FIG. 1 is a schematic representation of an exemplary system in accordance with the present invention.

An exemplary system in accordance with the present invention is shown in FIG. 1. The system basically includes an electrochemical cell 10 and a thermal regenerator 12.

The electrochemical cell 10 includes a cathode compartment 18 and an anode compartment 20. The cathode and anode compartments 18 and 20 are separated by a common ion permeable separation wall 22. The ion permeable separation wall 22 can be any of the common ion permeable membranes or other porous materials conventionally utilized in electrochemical cells to allow ion communication between the solutions present in the anode and cathode compartments, including microporous membranes, cation exchange membranes and anion exchange membranes. Ion permeable membranes include, for example, conventional microporous polymer battery separators comprising, for example, hydrophilic microporous polypropylene. Cation exchange membranes may comprise, for example, Nafion, a trademark of E.I. DuPont de Nemours of Wilmington, Del., and which is a polymer of polytetrafluoroethylene with fluorinated ether side chains terminated with sulfonic acid groups. An anion exchange membrane may comprise, for example, an alkali-resistant copolymer of vinyl chloride and acrylonitrile with quaternary nitrogen groups, available from Ionics, Inc. of Watertown, Mass.

A cathode 24 is located in the cathode compartment 18, and anode 26 is located in the anode compartment 20. Both the cathode and the anode are hydrogen ion reacting electrodes, that is, electrodes which react with hydrogen ions or hydrogen gas. There are many types of pH sensitive or hydrogen ion reacting electrodes which can support reasonably high current flow, as required in the present invention. For example, the quinone-hydroquinone electrode is well known. In addition, there are chemically-modified electrodes incorporating many dyes and other organic moieties which are pH sensitive. Preferred electrodes comprise hydrogen electrodes, such as silver-palladium or platinized porous carbon, or metal oxide electrodes, such as lead dioxide ($PbO_2$) or manganese dioxide ($MnO_2$), both of which are stable in acid and base environments. Such electrodes are known in the art and commercially available. The term "hydrogen electrode" is used herein to designate any hydrogen gas electrode. One type of hydrogen electrode comprises a porous structure made from carbon or graphite and Teflon mixed with a platinum catalyst and manufactured so that one side of the electrode tends to be hydrophobic and the other side tends to be hydrophilic. Another type of hydrogen electrode is a hydrogen-permeable silver-palladium alloy (Ag-Pd) foil activated with palladium black as described by Chodosch and Oswin, *Rev. Energ. Primaire*, Vol. 1, No. 3, pages 109–115 (1965). Yet another type of hydrogen electrode which is suitable for cathodes only comprises a fine-mesh screen covered with platinum black. Still another type of hydrogen electrode is referred to as a solid polymer electrolyte (SPE) electrode and comprises a structure in which electrocatalyst is bonded directly to both sides of a solid polymer ionomer membrane to form the cathode and anode. In one method of construction of an SPE electrode, the catalyst in the form of a fine powder is mixed with Teflon emulsion solution and sintered at about 345° C. The sintered Teflon-bonded catalyst is then bonded to the SPE membrane at elevated temperature and under pressure. In an alternative embodiment of the present invention, a gas-liquid electrode may be used as discussed in greater detail with regard to FIG. 3.

The cathode compartment 18 includes a cathode fluid which is in contact with cathode 24. The cathode fluid comprises a Bronsted acid, i.e., a proton donor. The acid is chosen so that the anion of the acid combines with the cation of the base to form a salt which can be thermally decomposed at a temperature below about 250° C. to directly form the acid and base as two decomposition products which can be separated to regenerate the acid and base starting materials for the electrochemical cell reaction. We have discovered that, if the difference in pH values (as determined in the actual solvents used in the system and then referred to a common reference) between the acid and the base, discussed below, is less than about 10, preferably within the range of 3 to 9, the thermal regeneration temperature, discussed below, can be maintained within the range of about 100 to 150° C. The cell reaction of the acid at a hydrogen cathode is shown in Equation (1) below, where hydrogen gas is generated or collected and acid is consumed at the cathode while the anion of the acid does not react at the cathode. The anion of the acid may have a valence other than that indicated in Equation (1).

$$X^- + H^+ + e^- \rightarrow \tfrac{1}{2}H_2 + X^- \qquad (1)$$

where
$X^-$ = anion of acid

If the cathode comprises a metal oxide-metal salt, one of two reactions may occur. If the metal salt $MX_2$ is soluble, a soluble supporting electrolyte salt, $LY_2$, must be added to the cathode solution in order to form an insoluble metal salt $MY_2$. In this case, the reaction at the metal oxide cathode is of the type indicated in Equation (2) below, where the anion of the acid does not react at the cathode. Other reactants having valences other than those indicated in Equation (2) may alternatively be used.

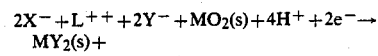

where
$X^-$ = anion of acid
$MO_2(s)$ = metal oxide
$L^{++} + 2Y^-$ = soluble supporting electrolyte salt
$MY_2(s)$ = insoluble metal salt
$L^{++}$ = cation of electrolyte salt The reaction of type indicated in Equation (2) above occurs in the majority of metal oxide electrode systems used in practising the present invention. However, in a few systems, the metal salt $MX_2$ formed is insoluble. In the latter case, a reaction of the type indicated in Equation (3) below occurs, where the anion of the acid reacts at the cathode to form the salt $MX_2$. It should be noted that valence changes for the metal and valences of X other than those shown in Equation (3) may be used, and Equation (3) presents just one exemplary reaction.

$$2X^- + MO_2(s) + 4H^+ + 2e^- \rightarrow MX_2(s) + 2H_2O \qquad (3)$$

where
$X^-$ = anion of acid
$MO_2(s)$ = metal oxide
$MX_2(s)$ = insoluble metal salt The water generated at the metal oxide cathode may pass through the separation wall between the electrode compartments or may be carried into the thermal regenerator and then vaporized.

Acids which may be used in practising the present invention include, but are not limited to, inorganic acids such as concentrated hydrochloric acid or phosphoric acid and organic acids such as methylsulfonic acid, trifluoro methylsulfonic acid, acetic acid, benzoic acid, and the borate ester formed by condensation of boric acid with ethylene glycol. In accordance with the present invention, either the acid or the base, discussed below, or both the acid and base comprise an organic material.

An anode fluid is located in the anode compartment 20 for contact with anode 26. The anode fluid comprises a Bronsted base, i.e., a proton acceptor. The base is chosen so that the cation of the base combines with the anion of the acid to form a salt which can be thermally decomposed at a temperature below about 250° C. to form two separable decomposition products and regenerate the acid and base, as previously discussed. The cell reaction of the base at a hydrogen anode is shown in Equation (4) below.

$$X^- + \tfrac{1}{2}H_2 + B \rightarrow BH^+ + e^- + X^- \qquad (4)$$

where
$X^-$ = anion of acid
$B$ = base

If the anode comprises a metal oxide, one of two reactions may occur. If the metal salt $MX_2$ is soluble, the anode must contain an insoluble metal salt $MY_2$. In this case, the reaction at the metal oxide anode is of the type indicated in Equation (5) below. Other reactants having valences other than those indicated in Equation (5) may alternatively be used.

$$MY_2(s) + 2H_2O + 4B \rightarrow MO_2(s) + 4BH^+ + 2Y^- + 2e^- \quad (5)$$

where
B = base
$MY_2(s)$ = insoluble metal salt
$MO_2(s)$ = metal oxide
$Y^-$ = anion of insoluble metal salt The reaction of the type indicated in Equation (5) above occurs in the majority of metal oxide electrode systems used in practising the present invention. However, in a few systems, the metal salt $MX_2$ formed is insoluble. In the latter case, a reaction of the type indicated in Equation (6) below occurs. Other reactants having valences other than those indicated in Equation (6) may alternatively be used.

$$MX_2(s) + 2H_2O + 4B \rightarrow MO_2(s) + 4BH^+ + 2X^- + 2e^- \quad (6)$$

where
$X^-$ = anion of acid
B = base
M = metal
$MO_2(s)$ = metal oxide

Thus, during the cell reaction, a cation of the base is generated and hydrogen or water is consumed at the anode. Bases which may be used in practising the present invention include, but are not limited to, inorganic bases such as ammonia and phosphine, and organic bases such as pyridine, aniline, triethanolamine, monoethanolamine, and diethylamine. As previously discussed, either the acid or the base or both comprise an organic material.

The net cell reaction for hydrogen electrodes comprises the summation of Equations (1) and (4) above, while the summation of Equations (2) and (5) or Equations (3) and (6) above provides the net cell reaction for metal oxide electrodes. As can be seen from these equations, the system of the present invention comprises a hydrogen ion concentration cell in which the base depolarizes and buffers the side of the cell containing dilute hydrogen ions. The net cell reaction when using either the hydrogen electrode or metal oxide electrode is indicated in Equation (7) below.

$$X^- H^+ + B \rightarrow BH^+ + X^- \quad (7)$$

As indicated by Equation (7), the net cell reaction and, therefore, the voltage of the system is independent of the type of electrode used. Thus, hydrogen electrodes should give the same voltage for the same chemical system as metal oxide electrodes. Experimental evidence for this conclusion is presented in Example 7.

The compound $BH^+ X^-$ indicated in Equation (7) is the salt formed by the combination of the cation of the base and the anion of the acid and is thermally decomposed to regenerate the acid and base as discussed in greater detail below. The salt is formed: (1) when the cation of the base ($BH^+$) migrates through a cation exchange membrane into the cathode compartment containing the anion of the acid ($X^-$); or (2) when the anion of the acid ($X^-$) migrates through an anion exchange membrane into the anode compartment containing the cation of the base ($BH^+$). Alternatively, a microporous membrane may be used which permits the migration of both anions and cations. In this case, the salt may be formed in both the anode and cathode compartments or predominantly in one compartment or the other, depending on relative ion mobility. If metal oxide electrodes are used, the salt $BH^+ X^-$ may also be formed when the insoluble metal salt $MX_2$ in the anode reacts with the base, as indicated in Equation (6) above.

As will be noted from the summation of Equations (2) and (5) or Equations (3) and (6), during the electrochemical cell reaction using metal oxide electrodes, such as lead dioxide, the cathode is converted from metal oxide to an insoluble metal salt, while the anode is converted from the metal salt to metal oxide. In order to avoid depletion of the electrodes, the flow of the acid and base through the cell must be switched periodically from one compartment to the other. The means for accomplishing this switching is described in greater detail with regard to FIG. 4.

The acid-base system in accordance with the present invention is either partially or totally organic. That is, either the acid or base or both acid and base comprise organic materials. Preferred systems in accordance with the present invention comprise a strong acid (pH of less than about 1) and a weak base (pH of less than about 12) or a strong base (pH of greater than about 12) and a weak acid (pH of greater than about 1). Certain strong acid-strong base systems may be used provided the temperature required for thermal decomposition of the salt does not exceed the upper limit of the heat input provided to the system. Certain weak acid-weak base systems may be used and have the advantage that lower temperatures are required for thermal decomposition of the salt, but the disadvantage that lower voltages are typically obtained from such systems.

A solvent or solvents may optionally be used for the acid or base or both acid and base. The solvents are selected based on the solubility requirements of the acid, base, salt thereof, and any added supporting electrolyte salt. If the salt is formed in the anode compartment, as discussed above, the solvents must be able to dissolve both the base and the salt. If the salt is formed in the cathode compartment, as discussed above, the solvent must be able to dissolve both the acid and the salt. Solvents can be used to increase fluidity and conductivity of the working fluids. The solvents can also be chosen to enhance the voltage of the electrochemical cell. If the solvent concentration difference between anode and cathode compartments is such that diffusion will enhance ion mobility through an ion selective membrane, voltage will be increased. If diffusion is counter to ion transport, the voltage will be reduced. An additional effect is that solvent on the base side lowers acid concentration and therefore increases voltage due to enhanced concentration cell activity differences between anode and cathode compartments. If the solvent enters into the electrode reactions, solvent concentration differences between the anode and cathode compartments will influence the voltage. The effect of various solvents on cell voltage is discussed in greater detail in Example 2 herein. It has been found that hydrogen-bonding solvents and high dielectric constant solvents enhance the cell voltage. However, either hydrogen-bonding solvents or non-hydrogen-bonding solvents which are miscible with the acid and base may be used. In addition, a mixture of one hydrogen-bonding solvent and one non-hydrogen-bonding solvent which are miscible with each other may be used. Preferred hydrogen-bonding solvents include ethylene glycol [designated herein as $Et(OH)_2$] and water. Preferred non-hydrogen-bonding miscible solvents include sulfolane or acetone. Water may be used alone or in conjunction with organic solvents. Dual solvents, that is, one solvent for the acid and one solvent for the base, may be used. Furthermore, it has been found desirable, although not essential, that the solvent for the component which will be volatilized in the thermal regenerator be also volatilized to some extent. In such a case, the use of a second solvent which is not volatilized assures that the non-volatile components in the acid-base system are kept in solution.

In addition, the solvent can be chosen to enhance the separation of the acid and base after the thermal decomposition of the salt, which is discussed below. It has been found that certain solvents increase the percent conversion, i.e., the amount of acid or base in the distillate versus the amount of acid or base in the material heated to decomposition. The effect of the solvent on the separation of the acid and base is discussed in greater detail in Example 3 herein.

In an alternative embodiment of the present invention, the base may be provided in the form of a gas while the acid is provided as a liquid. This embodiment is discussed in greater detail with regard to FIG. 3 herein.

As shown in FIG. 1, the electrodes 24 and 26 are connectable to an external circuit schematically shown as 28 for generating an electrical current and voltage. The external circuit 28 can include electric motors or other systems for utilizing the electric energy generated by cell 10, or batteries or other suitable systems for storing the electric energy generated by cell 10. Moreover, energy storage may be provided for the system of the present invention in order to allow the electrochemical cell to operate during periods when no heat input is available to the thermal regenerator. This storage can best be accomplished by storing the regenerated acid and base fluids from the thermal regenerator in separate storage tanks. When electric energy is needed during periods without heat input, the stored fluid is then circulated through the electrochemical cell. Similarly, spent fluids from the electrochemical cell can be stored in separate storage tanks during periods when heat is not available for regeneration, and regeneration can be resumed when heat becomes available.

The temperature of cell 10 and the anode and cathode solutions therein is preferably maintained within the range of 0° to 100° C. (32° to 212° F.) or within the temperature range discussed in further detail below.

The pressure within the present system may be maintained at atmospheric pressure or above or below atsmopheric pressure. In addition, the pressure in the electrochemical cell may be different than the pressure in the remainder of the system. The pressure in the cell may be increased above the pressure in the remainder of the system in order to be able to increase the temperature of the cell fluids without causing thermal decomposition. The pressure in the system may be decreased below that in the rest of the system in order to reduce the upper temperature (discussed below) of the system, where limited heat input is available, such as in an undersea application.

In order to continually regenerate the acid and base consumed during operation of cell 10, the salt formed as described above is thermally decomposed. To accomplish this decomposition and regeneration, the electrolyte containing the salt is removed from the cell and transferred to the thermal regenerator. If the salt is formed in the anode compartment, as previously described, the anode solution is transferred to the thermal regenerator. If the salt is formed in the cathode compartment, as previously described, the cathode solution is transferred to the thermal regenerator. If the salt is formed in both the anode and cathode compartments, as previously described, both the cathode and anode solutions are transferred to the thermal regenerator. For the sake of simplicity, FIG. 1 shows only one alternative, that in which the salt is formed in the cathode compartment, but the apparatus may be readily modified to accommodate the other alternatives mentioned. In FIG. 1, the cathode solution is continually removed from the cell via line 30 and transferred to the thermal regenerator 12 utilizing pump 32 or other liquid transfer device. The cathode solution transferred in line 30 contains the salt in a solvent in the same concentration as present in the cathode compartment 20. (It should be noted that for this embodiment the solvent for the salt may be the acid. In alternative embodiments, the solvent for the salt may be the base.) In the thermal regenerator 12, the transferred cathode solution is heated to a temperature below about 250° C., typically in the range of about 80° to 250° C. to thermally decompose the salt to form the acid and base, as shown in Equation (8) below.

$$BH^+X^- \rightarrow B + H^+X^- \qquad (8)$$

where
 B=base
 X$^-$=anion of acid

The acid and base must be capable of being separated. If either the acid or base is volatile and the other is not, then the volatile component may be condensed and returned to the cathode compartment if it is the acid or the anode compartment if it is the base. To achieve maximum system efficiency, excess vaporization and condensation of the base in the system shown in FIG. 1 or the acid for an alternative embodiment should be avoided. If the base is the volatile component, salt and acid are transferred to the thermal regenerator from the cathode compartment so that the base being vaporized is derived mostly from the salt. Similarly, if the acid is the volatile component, salt and base are transferred to the thermal regenerator from the anode compartment so that the acid being vaporized is derived mostly from the salt. For simplicity in illustration, FIG. 1 shows only the alternative in which the base is the volatile component, but the apparatus may be readily modified to accommodate the acid as the volatile component. As shown in FIG. 1, the volatile base flows out of thermal regenerator 12 into line 34 where it is cooled and condensed by cooling means 38 to a temperature of about 0° to 80° C. The cooling means 38 may comprise water which is circulated about line 38. When used for for undersea applications, the cooling in the present system may be conveniently provided by sea water. Optionally, other cooling means which may be used include natural or forced air convection or evaporative cooling. The cooled base is then conducted through line 36 into the anode compartment 20 to replenish the base therein. It should be noted that some solvent may vaporize with the volatile base component and be condensed therewith and returned to the anode compartment. In accordance with an alternative embodiment of the present invention as described below with reference to FIG. 3, the volatile base and volatile solvent may be mixed with hydrogen gas from the cathode compartment and the mixture fed into the anode compartment as a gas, with cooling means being incorporated into the cell to remove reaction heat in order to maintain the desired cell temperature. The liquid acid component remaining in the thermal regenerator 12 after heating is conducted out through line 40, through cooling means 42, and is returned to the cathode compartment to replenish the acid therein. Solvent which was not volatilized by heating in the thermal regenerator 12 is carried along with the acid component. In order to maximize the efficiency of the system of the present invention, recuperative heat exchangers may be inserted to transfer heat from lines 34 and 40 into line 30 shown in FIG. 1. In this case, cooling means 42 is omitted. Thus, the heat input required for thermal regenerator 12 can be minimized.

The temperature at which the salt can be decomposed and the temperature at which the volatile component can be condensed determine the upper and lower temperature limits, respectively, of the system of the present invention. The maximum possible efficiency of such a system is defined by the Carnot Equation (9) below.

$$U - L/U = \text{efficiency} \qquad (9)$$

where
U = upper temperature (degrees absolute)
L = lower temperature (degrees absolute)
In order to maximize efficiency, the difference between the upper and lower temperatures should be as large as possible. As a practical matter, the upper temperature is determined by the heat input provided, which is below about 250° C. in accordance with the present invention. The heat input may be provided from any conventional or known means. In order to provide an efficient system, it is desirable that the heat input be provided from the waste heat of a system external to the thermoelectrochemical system, such as an internal combustion engine. The major sources of waste heat in an automobile are from the exhaust gases and from the engine coolant. The highest temperature permissable for an engine coolant system is about 140° C. The lowest practical radiator heat rejection temperature is about 60° C. The temperature differential of 80° C. represents a maximum theoretical Carnot efficiency of 80/413 or about 20%. If up to 75% of this efficiency can be practically realized, then a power of 5 kilowatts could be realized from the engine coolant fluid alone, without even tapping the heat from the exhaust gases.

The heat input for the present system may also be advantageously provided from an oil well head, such as an undersea oil well having a temperature within the range of 80° to 150° C. Other sources of heat for the present system may include exhaust gases or heat transferred from any internal or external combustion device, including steam turbines, gas turbines, furnaces, or ovens; geothermal heat, from natural hot springs or as the result of oil drilling on land or undersea; or solar collectors, in the form of parabolic troughs or parabolic dishes. In addition, the heat for the present system may be provided by the low grade waste heat generated in various industrial processes, such as steel manufacture, oil refining, or chemical processing, to name just a few.

In accordance with the present invention, the electrochemical cell can be operated with the anode fluid and cathode fluid at any temperature within the range of the upper and lower temperatures defined above. However, if the gas-liquid electrode, described below, is used, the electrode must be operated below the upper temperature. Lower temperatures have the advantage that no insulation is required and that the electrolytes and electrodes are more stable than at elevated temperatures. However, at higher temperatures, the cell losses are decreased and the efficiency of the cell is improved. Thus, some insulation or heating of the electrochemical cell may be desirable.

At higher temperatures, the cell may be pressurized by means of fluid circulating pumps, as previously discussed to prevent decomposition of the salt in the cell itself. The cell reaction products then pass into the thermal regenerator through a pressure reduction valve. It has been observed that the voltage of some acid-base systems increases with temperature, so that the cell can be operated at or just below the thermal regenerator temperature. In this case, cooling means 42 shown in FIG. 1 is not required. Cooling means 38 condenses the gas to a liquid at the lower temperature; pump 32 compresses the liquid to a pressure above the decomposition pressure in thermal regenerator 12; heating means (not shown) are used to heat the condensed, pressurized liquid in line 36 to approximately the upper temperature; the liquid passes into compartment 20 in the cell 10 at the upper temperature. The hot, pressurized cell effluent leaves through line 30 and passes through pressure reduction valve 33 to allow the salt to decompose in regenerator 12. Both pumps 32 are controlled to maintain zero pressure differential across membrane 22.

Other methods for separating the acid and base besides the differences in volatility described herein, which may occur to a person skilled in the art are intended to be included in the present invention. Such methods would rely on differences in selected properties of the acid and base, such as solubility, miscibility, or ionic character.

The system of the present invention may be practiced using a variety of acid-base systems. Examples of such systems include, but are not limited to, those listed below.

a. Pyridine - methylsulfonic acid ($CH_3SO_3H$)
b. Pyridine - hydrochloric acid
c. Pyridine - phosphoric acid
d. Pyridine - trifluoromethylsulfonic acid ($CF_3SO_3H$)
e. Acetic acid ($CH_3COOH$) - triethanolamine [designated herein as $N(EtOH)_3$]
f. Acetic acid - monoethanolamine [designated herein as $NH_2EtOH$]
g. Acetic acid - diethylamine [designated herein as $NH(Et)_2$]
h. Acetic acid - pyridine
i. Benzoic acid ($C_6H_5COOH$)-ammonia ($NH_3$)
j. Aniline - hydrochloric acid
k. Ammonia - borate ester [condensation product of boric acid ($H_3BO_3$) and ethylene glycol]

Figure 2:
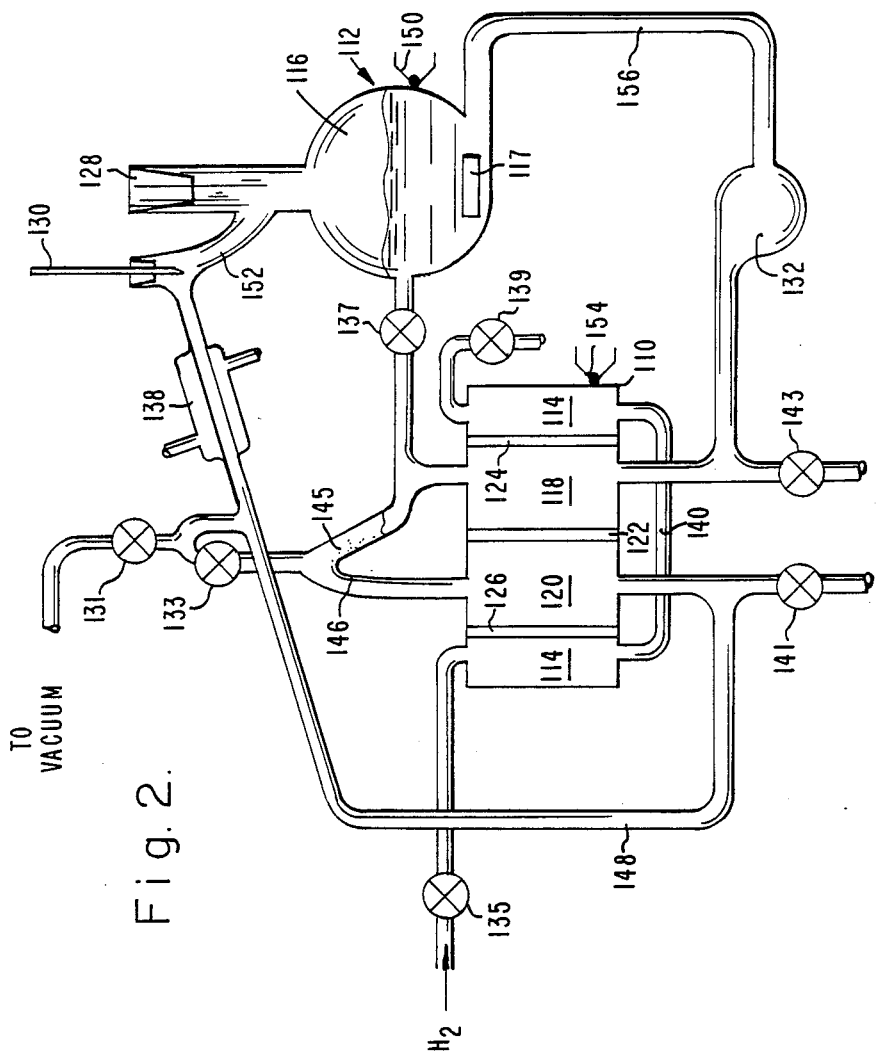
FIG. 2 is a schematic representation of an experimental test set-up used in practising the process of the present invention.

The open circuit voltage of various acid-base systems in accordance with the present invention was measured using the closed loop apparatus shown in FIG. 2, which is described below. The test results are presented in Example 1. As previously noted, test results showing solvent effects and membrane types are summarized in Example 2 and 3. Additional current density tests were made of a new gas-liquid electrochemical cell, using the system shown in FIG. 3, and these results are discussed in Examples 4 and 5. Polarization studies of a system using lead dioxide electrodes in the system of FIG. 2 are discussed in Example 6. Tests indicating the effect of electrode type on output voltage are summarized in Example 7. Additional tests of acid-base systems useful in practising the process of the present invention were performed in an open loop system and the results are summarized in Example 8.

FIG. 2 presents a schematic representation of the experimental test set-up used in generating the closed loop data presented in Example 1. The test set-up shown in FIG. 2 represents a practical adaptation of the schematic representation of the system shown in FIG. 1. A description of how the system of FIG. 2 was used in operation follows.

The system shown in FIG. 2 was filled with a predetermined working fluid comprising a mixture of acid, base and solvent, through stopper 128 to a level of about 200-500 cc in a 1000 cc boiler flask 116 containing a magnetic stirring bar 117. The latter was used to prevent bumping in the boiler. The system was evacuated through valve 131 to a pressure of about 1 mm Hg. The thermal regenerator means 112 comprised boiler flask 116, a covering (not shown) which insulated the boiler flask 116, and included controllable heating means for heating flask 116 to the desired temperature as measured by thermocouple 150 which was taped to flask 116. Either acid or base (depending on their relative volatility and any azeotropes that are formed) boiled off as a gas as the salt was decomposed by heating the solution in boiler flask 116. The reflux temperature was determined with thermometer 130. If more theoretical plates are desired for a better separation of acid and base, a vigreaux column may be used in place of sidearm 152. The gas, in this case a base, was condensed in condenser 138, through which cold water from a thermostatted recirculating bath was passed. Thus, the bath was used to measure and control the condenser temperature. Valve 133 was normally kept closed to prevent any vapor transport into space 145. Condensate was collected and led through tube 148 into anode compartment 120 of the electrochemical cell, and then over the overflow weir 146 into space 145. The overflow weir 146 prevented backstreaming of the solution from cathode compartment 118 into anode compartment 120. As condensate continually passed through anode compartment 120, peristaltic pump 132 circulated the boiler fluid at a flow rate of about 4 ml/min from flask 116 through tubing 156 into cathode compartment 118. The combined effluent from anode compartment 120 and cathode compartment 118 was then passed back into boiler flask 116 through valve 137, which was kept sufficiently cracked so that the level in space 145 stayed below the top of the weir 146.

Separator 122 was either an anion, cation or microporous membrane. Hydrogen electrodes 124 and 126 were porous platinized carbon electrodes or activated $H_2$-permeable Ag-Pd foil electrodes. Most of the experiments described herein were performed with the Ag-Pd alloy hydrogen electrodes. Hydrogen was passed in through valve 135 and out through valve 139 until spaces 114 were flushed out and the Ag-Pd alloy electrodes were $H_2$-saturated. Both valves 135 and 139 were then closed, trapping the hydrogen gas before experiments were begun. During cell operation hydrogen gas is generated at the cathode and used up at the anode. Tubing 140 allows the hydrogen to pass from the cathode to the anode. The temperature of the cell was monitored by thermocouple 154 and controlled by heating means and insulation (not shown) over the entire cell 110. Tubing 156 was long enough and the pump rate of 4 ml/min slow enough so that the boiling fluid was cooled to room temperature by the time it was introduced into cathode compartment 118.

Both open circuit voltages and cell polarization were measured as a function of system parameters. A clamp on stopper 128 permitted pressures up to 22 psia ($1.5 \times 10^5$ pascals) to be used in the system. Condensation was effective enough so that subatmospheric pressure was usually maintained in the system. After completion of the experiment, valves 141 and 143 were used to empty the system.

Figure 3:
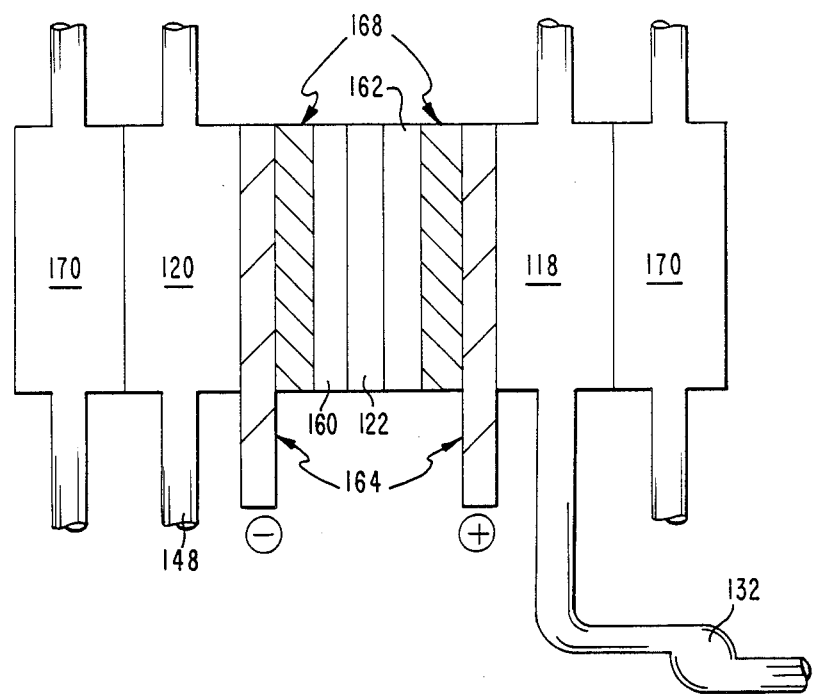
FIG. 3 is a schematic representation of an experimental test set-up used in practising an alternative embodiment in accordance with the present invention, in which one electrode fluid comprises a gas.

Turning now to FIG. 3, there is shown a schematic representation of the experimental test set-up used in practising an alternative embodiment of the present invention in which the base is in gaseous form. Only the portion of the system which differs from that shown in FIG. 2 is indicated in FIG.3. The electrode assembly may consist of a solid polymer electrolyte (SPE) electrode, which is a particular type of hydrogen electrode. The electrode assembly shown in FIG. 3 comprises two hydrogen electrodes, anode 160 and cathode 162, which are bonded to an ion permeable separation wall 122, such as a Nafion membrane. Current collectors to the electrode assembly comprise gold plated screens 164 which are pressed against conductive graphite cloths 168. The graphite cloths 168 are pressed against the anode 160 and the cathode 162. The cathode compartment 118 behind the hydrophilic cathode 162 is filled with a solution of the selected acid. The anode compartment 120 behind the hydrophobic anode 160 is filled with a gaseous base, such as ammonia mixed with hydrogen, and water vapor. The base functions as a depolarizer while the hydrogen reacts at the electrode, and the water vapor functions as a solvent. Cooling passages 170 are provided to remove heat generated in the cell reaction. In this case, cooling means 138 indicated in FIG. 2 is not required for the system shown in FIG. 3. Tubing 148 conducts the gaseous base, hydrogen and water vapor from the thermal regenerator 112 (of FIG. 2) back to the anode compartment 120. Hydrogen gas produced at the cathode 162 bubbles off, flows into the cathode compartment 118, and is carried with the cathode compartment solution to the thermal regenerator 112 (of FIG. 2). The hydrogen then flows through tubing 148 to the anode compartment 120. Pump 132 is used as discussed with regard to FIG. 2. The advantage of using such a solid polymer electrolyte gas-liquid electrode is that solution resistance is minimized since the electrodes 160 and 162 are adjacent to the separator 122 and do not incorporate the anode and cathode compartment solution resistance into the cell voltage drop. Voltage is thus increased.

Alternatively, the SPE electrodes shown in FIG. 3 may be replaced with a gas electrode for the anode and a platinum black cathode as discussed in Example 5. Moreover, the gas-liquid electrochemical cell described above with regard to FIG. 3 may be readily adapted to produce an electrochemical reaction between a gaseous reactant and a liquid reactant other than those specifically described herein.

Using such a gas-liquid electrochemical cell with a system comprising an acid HX and ammonia and hydrogen as the base gas, the reactions at the cathode and anode are indicated in Equations (10) and (11), respectively. Ammonium ions diffuse through the membrane and react with the anion of the acid to form the salt as indicated in Equation (12). The net cell reaction is shown in Equation (13).

$$2NH_3 + H_2 \rightarrow 2NH_4^+ + 2e^- \qquad (10)$$

$$2e^- + 2HX \rightarrow 2H_2 + 2X^- \quad (11)$$

$$2X^- + 2NH_4^+ \rightarrow 2NH_4^+X^- \quad (12)$$

$$2NH_3 + 2HX \rightarrow 2NH_4^+X^- \quad (13)$$

The results obtained using the system shown in FIG. 3 and an SPE electrode are discussed in Example 4. The results obtained using the system shown in FIG. 3 modified with a gas electrode are discussed in Example 5.

Figure 4:
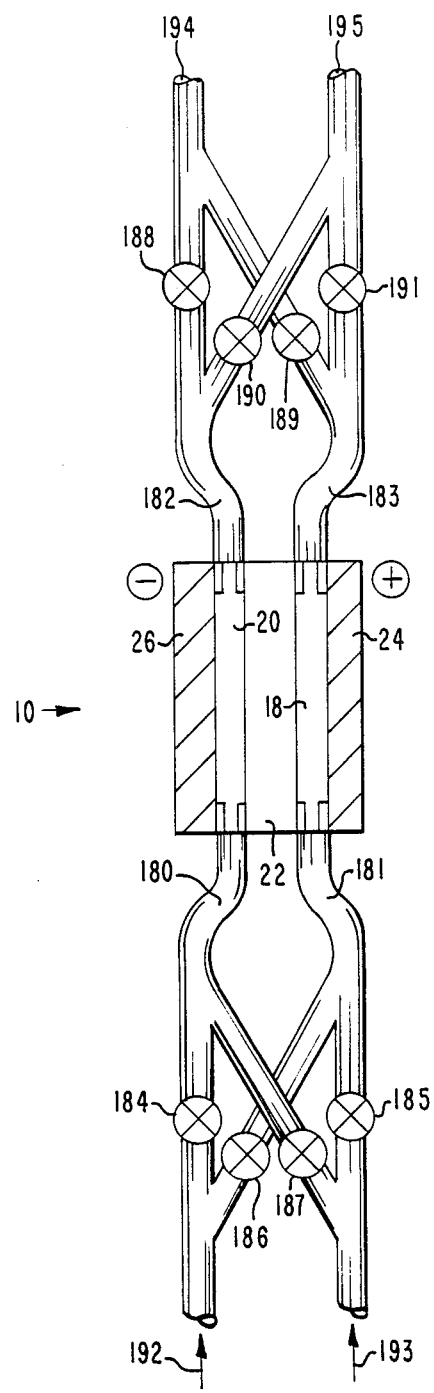
FIG. 4 is a schematic representation of an experimental test set-up for periodically reversing the flow of acid and base in practising an alternative embodiment of the present invention using metal oxide electrodes.

In FIG. 4 there is shown a schematic representation of an experimental test set up for periodically reversing the flow of acid and base in one embodiment of the present system using metal oxide electrodes. For the sake of simplicity, lead dioxide is used as an example in the following discussion. However, this discussion applies also to other known metal oxide electrodes.

A lead dioxide electrode comprises a mixture of lead dioxide and the insoluble lead salt, such as lead sulfate, formed by reaction of the lead ion with the anion of the acid or the anion of the soluble supporting electrolyte salt, as previously discussed in general with regard to Equation (2) and (3). As the cell operates, the anode is converted from $PbSO_4$, for example, to $PbO_2$ and the cathode is converted from $PbO_2$ to $PbSO_4$. In order to continue operation, the flow of acid and base must be interchanged or reversed periodically so that the acid flows through the compartment which the base previously flowed through and vice versa. This change in flow pattern can be accomplished by using the apparatus shown in FIG. 4.

The apparatus shown in FIG. 4 is incorporated into the apparatus shown in FIG. 1. Elements in FIG. 4 which are in common with those in FIG. 1 are indicated by the same reference designators.

In FIG. 4, the electrochemical cell is shown generally as 10. Two oxide electrodes 26 and 24 are separated by a membrane 22. Base solution is pumped through the anode compartment 20 from manifold 180 to manifold 182. Acid solution is pumped through the cathode compartment 18 from manifold 181 to manifold 183. During initial operation, valves 186, 187, 189 and 190 are closed. Valves 184, 185, 188 and 191 are open. Base flows through line 192, valve 184, manifold 180, compartment 20, manifold 182, valve 188, and out through line 194. Acid flows through line 193, valve 185, manifold 181, compartment 18, manifold 183, valve 191, and out through line 195. After the electrodes have been sufficiently converted, all valves are switched. Base then flows through line 192, valve 186, manifold 181, compartment 18, manifold 183, valve 189, and out through line 194. Acid flows through line 193, valve 187, manifold 180, compartment 20, manifold 182, valve 190, and out through line 195.

Examples of practice of the present invention are presented below.

EXAMPLE 1

This example presents test data for various acid-base-solvent systems in accordance with the present invention. The system comprised the closed loop apparatus shown in FIG. 2, which was used as previously described herein. The electrodes were Ag-Pd electrodes. The working fluids were at approximately atmospheric pressure. The open circuit voltage of each system was measured. Table I summarizes the system components and concentrations thereof, relevant temperature measurements, and the open circuit voltage measured for each system. The concentration of each component indicates the amount originally introduced into the system. The open circuit voltage was measured using a model 363, potentiostat/galvanostat obtained from Princeton Applied Research of Princeton, N.J. and/or a model 8050A digital multimeter obtained from Fluke Company of Everett, Wash. The stability of all open circuit voltages was confirmed by drawing current for an extended period of time and then observing the reestablishment of the open circuit voltages. Systems A and C shown in Table I are strong acid-weak base systems, whereas Systems B and D are strong base-weak acid systems. All systems used the same two solvents. The highest voltage was obtained with System B, but it should be noted that System D was further optimized in Example 8 by changing one solvent. This example shows that either strong acid-weak base or weak acid-strong base systems in accordance with the present invention yield satisfactory results.

The results indicated in Table I show that the system can run with a variety of working fluids in closed loop operation and that either the base or the acid can be the volatile species. The temperature ranges indicate that the system is compatible with heat available from internal combustion waste heat or undersea geothermal heat.

TABLE I

| SYSTEM/COMPONENTS | CONCENTRATION (MOLES) | BOILER TEMP (°C.) | CONDENSER TEMP (°C.) | REFLUX TEMP (°C.) | OPEN CIRCUIT VOLTAGE (VOLTS) |
|---|---|---|---|---|---|
| A. Pyridine-sulfonic acid: | | 110 | 0 | 80 | 0.34 |
| pyridine* | 1.0 | | | | |
| methylsulfonic acid | 1.0 | | | | |
| water* | 3.0 | | | | |
| ethylene glycol | 3.5 | | | | |
| B. Ammonia-borate ester: | | 120 | 0 | 78 | 0.36 |
| boric acid ($H_3BO_3$) | 1.0 | | | | |
| ammonia* | 1.0 | | | | |
| water* | 0.5 | | | | |
| ethylene glycol | 4.0 | | | | |
| C. Pyridine-hydrochloric acid: | | 119 | 22 | — | 0.23 |
| hydrochloric acid | 1.0 | | | | |
| pyridine* | 2.1 | | | | |
| water* | 3.5 | | | | |
| ethylene glycol | 6.8 | | | | |
| D. Ethanolamine-acetic acid: | | 107 | 0 | 79 | 0.23 |

TABLE I-continued

OPEN CIRCUIT VOLTAGES OF CLOSED LOOP SYSTEMS

| SYSTEM/COMPONENTS | CONCEN-TRATION (MOLES) | BOILER TEMP (°C.) | CONDENSER TEMP (°C.) | REFLUX TEMP (°C.) | OPEN CIRCUIT VOLTAGE (VOLTS) |
|---|---|---|---|---|---|
| acetic acid* | 1.1 | | | | |
| triethanolamine | 1.0 | | | | |
| water* | 1.0 | | | | |
| ethylene glycol | 1.6 | | | | |

*Volatile components which distill

EXAMPLE 2

This example illustrates the effect of various solvents on the cell voltage of systems in accordance with the present invention using various acid-base combinations and ion exchange membranes. The cation exchange membrane was formed of Nafion 110, which was obtained from E. I. DuPont of Wilmington, Del. The anion exchange membrane was AR108CMP401, obtained from Ionics, Inc. of Watertown, Mass., and comprised an alkali-resistant copolymer of vinyl chloride and acrylonitrile with quaternary nitrogen groups. The microporous membrane was Celgard type 5511, obtained from Celanese, Inc. of Charlotte, N.C. The electrodes were AgPd electrodes. As indicated in Tables II, III and IV, the acid and base for each system were dissolved in a variety of solvents in various molar ratios. Using a system similar to that shown in FIG. 2, the cell voltages were measured and are shown in Tables II, III and IV. Voltage measurements for the pure acid-base combination are indicated first and are followed by voltages obtained using solvents added to the acid or base in mole ratios ranging from 0.5 to 10. About 3 moles of solvent to 1 mole of base gives the greatest voltage enhancement. The effect of non-hydrogen bonding and low dielectric constant solvents is also indicated in Tables II, III and IV as being beneficial in some systems, but not as beneficial, and even negative in other systems. Dimethyl sulfoxide (DMSO) is itself a strong base, and for that reason enhances voltages significantly if added to the base side of the cell.

TABLE II

SOLVENT EFFECTS USING CATION EXCHANGE MEMBRANE

| Acid | Solvent/Acid Mole Ratio | Base | Solvent/Base Mole Ratio | Cell Voltage (Volts) |
|---|---|---|---|---|
| $CH_3COOH$ | 0 | $NH_2EtOH$ | 0 | 0.840 |
| | 0 | | 1 ($H_2O$) | 0.900 |
| | 0 | | 3 ($H_2O$) | 0.928 |
| | 0 | | 3 [$Et(OH)_2$] | 0.900 |
| | 0 | | 3 (Sulfolane) | 0.850 |
| | 0 | | 3 (Acetone) | 0.769 |
| $CH_3COOH$ | 0 | $NH(Et)_2$ | 0 | 0.789 |
| | 0 | | 1 ($H_2O$) | 1.005 |
| | 0 | | 3 ($H_2O$) | 1.075 |
| | 3($H_2O$) | | 0 | 0.710 |
| | 3($H_2O$) | | 3 ($H_2O$) | 1.051 |
| | 0 | | 10 ($H_2O$) | 1.060 |
| | 0 | | 3 [$Et(OH)_2$] | 1.039 |
| | 0 | | 3 (Acetone) | 0.597 |
| $CH_3COOH$ | 0 | pyridine | 0 | 0.538 |
| | 0 | | 3 ($H_2O$) | 0.556 |
| | 0 | | 10 ($H_2O$) | 0.517 |
| | 3 ($H_2O$) | | 0 | 0.310 |
| | 10 ($H_2O$) | | 0 | 0.200 |
| | 10 ($H_2O$) | | 10 ($H_2O$) | 0.320 |
| | 0 | | 3 (DMSO) | 0.657 |
| $CH_3COOH$ | 0 | pyridine | ∞ (DMSO) | 0.708 |

TABLE II-continued

SOLVENT EFFECTS USING CATION EXCHANGE MEMBRANE

| Acid | Solvent/Acid Mole Ratio | Base | Solvent/Base Mole Ratio | Cell Voltage (Volts) |
|---|---|---|---|---|
| | 3 (DMSO) | | 0 | 0.275 |
| | 3 (DMSO) | | 3 (DMSO) | 0.400 |
| | 0 | | 3 ($CH_3OH$) | 0.583 |
| | 0 | | 3 (Sulfolane) | 0.580 |
| | 0 | | 3 (Acetone) | 0.590 |
| | 3 [$Et(OH)_2$] | | 0 | 0.210 |
| | 3 [$Et(OH)_2$] | | 3 ($CH_3OH$) | 0.250 |
| | 3 (Sulfolane) | | 0 | 0.270 |
| | 3 (Sulfolane) | | 3 ($CH_3OH$) | 0.350 |
| | 3 (Acetone) | | 0 | 0.550 |
| | 3 (Acetone) | | 3 (Acetone) | 0.520 |
| $CH_3SO_3H$ | 0 | pyridine | 0 | 0.650 |
| | 3 ($H_2O$) | | 0 | 0.460 |
| | 3 [$Et(OH)_2$] | | 0 | 0.535 |
| | 3 (Acetone) | | 0 | 0.622 |
| $CH_3SO_3H$ | 0 | $NH(Et)_2$ | 0 | 0.707 |
| | 0 | | 3 $H_2O$ | 1.059 |

DMSO = dimethylsulfoxide
$Et(OH)_2$ = ethylene glycol
$NH_2EtOH$ = monoethanolamine
$NH(Et)_2$ = diethylamine

TABLE III

SOLVENT EFFECTS USING ANION EXCHANGE MEMBRANE

| Acid | Solvent/Acid Mole Ratio | Base | Solvent/Base Mole Ratio | Cell Voltage (Volts) |
|---|---|---|---|---|
| $CH_3COOH$ | 0 | pyridine | 0 | 0.568 |
| | 0 | | 3 ($H_2O$) | 0.660 |
| | 3 ($H_2O$) | | 0 | 0.783 |
| | 3 ($H_2O$) | | 3 ($H_2O$) | 0.734 |
| | 0 | | 3 (Sulfolane) | 0.725 |
| | 3 (Sulfolane) | | 0 | 0.713 |
| | 3 (Sulfolane) | | 3 (Sulfolane) | 0.725 |
| $CH_3COOH$ | 0 | $NH_2EtOH$ | 0 | 0.820 |
| | 0 | | 3 ($H_2O$) | 0.894 |
| | 3 ($H_2O$) | | 0 | 0.986 |

TABLE IV

SOLVENT EFFECTS USING MICROPOROUS MEMBRANE

| Acid | Solvent/Acid Mole Ratio | Base | Solvent/Base Mole Ratio | Cell Voltage (Volts) |
|---|---|---|---|---|
| $CH_3COOH$ | 0 | pyridine | 0 | 0.545 |
| $CH_3COOH$ | 0 | | 3 ($H_2O$) | 0.654 |
| $CH_3COOH$ | 3 ($H_2O$) | | 3 ($H_2O$) | 0.722 |
| $CH_3COOH$ | 3 ($H_2O$) | | 0 | 0.619 |
| $CH_3COOH$ | 0 | $NH_2EtOH$ | 0 | 0.862 |
| $CH_3COOH$ | 0 | $NH_2EtOH$ | 3 ($H_2O$) | 0.913 |
| $CH_3COOH$ | 3 ($H_2O$) | $NH_2EtOH$ | 0 | 0.966 |

TABLE IV-continued
SOLVENT EFFECTS USING MICROPOROUS MEMBRANE

| Acid | Solvent/Acid Mole Ratio | Base | Solvent/Base Mole Ratio | Cell Voltage (Volts) |
|---|---|---|---|---|
| $CH_3COOH$ | Distillate[1] | $N(EtOH)_3$ | Bottoms[2] | 0.747 |

$N(EtOH)_3$ = triethanolamine
[1]Distillate = 53 mole % acetic acid, 47 mole % water
[2]Bottoms = 40 mole % triethanolamine, 40 mole % sulfolane, 7 mole % water, 13 mole % acetic acid For cation membranes, the data emphatically shows that hydrogen-bonding solvents enhance voltage by assisting cation migration when the solvent is on the base side and, as expected, diminish voltage when on the acid side. As expected for anion membranes, the effect is the reverse. It is interesting to note that for the non-hydrogen-bonding solvent sulfolane in Table III, the effect is opposite to the hydrogen-bonding solvent. This effect is utilized to advantage in Example 8. Consistent with the data in Tables II and III is the data of Table IV for microporous membranes, in which the voltage enhancement is approximately equal for both sides of the cell.

EXAMPLE 3

This example illustrates the effect of various solvents on the separation of the acid and base components in accordance with the process of the present invention. A series of distillation tests was conducted in order to control the ratio of solvent to acid or base in the distillate, and to assess the amount of distillate that could be obtained. Table V indicates the results of these tests using various ratios of volatile to non-volatile solvents. The data shown in Table V was generated using a separate thermal regeneration test set-up in which the initial mixture of acid, base and solvents indicated in Table V was heated in a flask to produce vaporization of the volatile component, which then passed through a vigreaux column and then into a water-cooled condenser. The vigreaux column adds theoretical plates to the distillation and results in a more extensive separation of acid and base. This is advantageous in some systems, but the extra heat required can offset the improvements in separation in terms of the overall system efficiency.

The condensate was collected in a flask and analyzed to determine the mole percent of the distillate which is the volatile acid or base (designated "Mole % Dist." in Table V). The percent conversion was calculated by dividing the amount of the volatile acid or base in the distillate by the amount of the volatile acid or base in the initial mixture. Up to three tests, indicated in Table V as "1", "2" and "3", were performed on each system as noted in Table V.

As indicated in Table V, a concentrated solution of pyridine in the distillate could not be obtained, whereas high concentrations of diethylamine and ammonia could be obtained if not much water was present. In addition, as indicated in Table V, a high concentration of acetic acid could be obtained if sulfolane was used as the solvent rather than ethylene glycol. It should also be noted that an especially high percent conversion was obtained in System D of Table V in the presence of sulfolane solvent and a small amount of water.

When operating the cell at or near the condenser temperature rather than the regenerator temperature, it is desirable to have a high percent conversion in order to minimize the heat input required for the regeneration process. In addition, it is advantageous to control the concentration of the distillate in order to maximize the solvent effect on the voltage. Both factors are important for maximizing overall system efficiency.

EXAMPLE 4

This example presents experimental results obtained from an alternative embodiment of the present invention in which a gaseous mixture containing a gaseous base was reacted at a solid polymer electrolyte electrode. The system comprised the closed loop apparatus shown in FIG. 3 and was used as previously described herein.

A cell was constructed using special solid polymer electrolyte (SPE) electrodes manufactured by Ergenics, Inc. of Wyckoff, N.J. and comprising a carbon-teflon-platinum mixture bonded to both sides of a Nafion sheet. The anode side was hydrophobic and the cathode side was hydrophilic. Current collectors to the electrode assembly consisted of gold plated screens pressed against Union Carbide VMF-75 graphite cloths which were pressed against both anode and cathode of the SPE electrode assembly. The cathode compartment behind the hydrophilic cathode electrode was filled

TABLE V
EFFECT OF SOLVENT ON SEPARATION OF ACID AND BASE

| SYSTEM COMPONENTS | INITIAL MIXTURE (MOLES) | | | MOLE % DIST.[2] | | | % CONVERSION | | | MAX. TEMP (°C.) | | |
|---|---|---|---|---|---|---|---|---|---|---|---|---|
| | 1 | 2 | 3 | 1 | 2 | 3 | 1 | 2 | 3 | 1 | 2 | 3 |
| A. Pyridine[1] | 1 | 1 | 1 | 4 | — | 14 | 2.6 | — | 8.2 | 176 | 160 | 180 |
| Methanesulfonic acid | 2.1 | 2.1 | 1 | | | | | | | | | |
| Ethylene glycol | 0 | 0 | 5.4 | | | | | | | | | |
| Water[1] | 1.5 | 3.1 | 0 | | | | | | | | | |
| B. Boric acid | 1 | | | 88 (in $H_2O$) | | | 36.6 | | | 84 | | |
| Diethylamine[1] | 1 | | | | | | | | | | | |
| Ethylene glycol | 3 | | | | | | | | | | | |
| Water[1] | Produced in ester reaction | | | | | | | | | | | |
| C. Boric acid | 1.0 | 1.0 | 1.0 | 2.7 | 12 | 35 | 6.5 | 17.7 | ~20 | 142 | 132 | 105 |
| Ammonia[1] | 1.2 | 1.0 | 1.0 | | | | | | | | | |
| Ethylene glycol | 1.7 | 4.0 | 4.0 | | | | | | | | | |
| Water[1] | 2.7 | 1.0 | 0.5 | | | | | | | | | |
| D. Acetic acid[1] | 1 | 1 | | 10 | 53 | | 19 | 65.8 | | 154 | 154 | |
| Triethanolamine | 1 | 1 | | | | | | | | | | |
| Ethylene glycol | 1.6 | — | | | | | | | | | | |
| Sulfolane | — | 1 | | | | | | | | | | |
| Water[1] | 1 | 0.5 | | | | | | | | | | |

[1]Volatile components which distill with a solution in the mole ratio 3:1, water: mathanesulfonic acid. The anode compartment behind the hydrophobic anode electrode had a gas mixture passing through it which was approximately ⅓ atmosphere pressure in each of the three gases: hydrogen, ammonia and water vapor. The cell temperature was 100° C. A current of 10 mA/cm² of electrode area was maintained at 455 mV across the external cell leads. Open circuit voltage was 495 mV, yielding a total cell drop of only 40 mV. These initial results suggest that with optimized electrodes at least 100 mA/cm² can be obtained at a voltage drop of less than 100 mV.

EXAMPLE 5

This example presents experimental results obtained from an alternative embodiment of the present invention using the system described in FIG. 3 modified with an alternative electrode assembly for electrochemically reacting a gaseous base.

A gas fuel cell electrode obtained from Energy Research Co. (of Danbury, Conn.) was used for the anode. The cathode was a 50 mesh screen covered with platinum black, which also doubled as the current collector. Four layers of microporous membrane (Celgard #5511, from Celanese Corporation of Charlotte, N.C.) were used for the separator. The microporous membrane replaced the solid polymer electrolyte membrane shown in FIG. 3 and described in Example 4. The fluid and gas mixtures were the same as those specified in Example 4. This cell produced 477 mV at a current density of 2.5 mA/cm² at 94° C. Open circuit voltage for this system was 550 mV, yielding a total cell drop of 73 mV. Of this drop, 72 mV was due to internal resistance, which could be substantially reduced in an optimized system.

EXAMPLE 6

This example presents experimental results for a system in accordance with the present invention using lead dioxide electrodes.

Measurements of cell currents were obtained using lead dioxide-lead sulfate electrodes in half cell tests. The lead dioxide ($PbO_2$) electrodes (from Faradane, Inc. of Huntington Beach, Calif.) were first fully charged in 5M $H_2SO_4$ and then discharged 10%. The electrodes were anodically tested in the following base solutions with sodium sulfate as the supporting electrolyte salt:

Solution 1: 30% (by Wt) $NH_3$ in $H_2O$
Saturated with $Na_2SO_4$
Solution 2: 25 Mole % Diethylamine in $H_2O$
Saturated with $Na_2SO_4$
Solution 3: 25 Mole % Pyridine in $H_2O$
Saturated with $Na_2SO_4$ A cathode test was conducted in 10 M $H_2SO_4$ (Solution 4). Measurements were made versus a calomel electrode with a platinum counter electrode. Solution resistance was subtracted from the observed readings to obtain activation plus concentration polarization. All tests were conducted at room temperature. Results of these tests are shown in Table VI for each of the above-noted solutions. From the data in Table VI, it can be seen that excellent results were obtained for pyridine and for diethylamine, as indicated by the zero polarizations, whereas the results for ammonia were not as good. Higher currents than those indicated in Table VI were not investigated due to voltage limitations caused by solution resistance.

EXAMPLE 7

This example illustrates the effect of different electrode types on the voltage of a system in accordance with the present invention.

As previously discussed with regard to Equation (7), the voltage of the present system should be independent of the type of electrodes used. This conclusion is supported by the data presented in Table VII.

In the system tested, the acid solution comprised 1 mole boric acid and 4 moles ethylene glycol, and the base solution comprised 30 weight percent ammonia in water. In each test, the identical type of electrode was used for both the anode and cathode. The salt bridge used in items 2 and 3 of Table VII is the equivalent of a microporous membrane separator. Since the type of membrane used was found to affect voltage only by ±3%, as indicated by the data in Tables II–IV, the difference in membrane type for items 1 and 2 of Table VII is not considered to noticeably affect voltage. With regard to item 3 of Table VII, it was found that the voltage kept increasing each time the acid solution was replaced with fresh acid and this increase appeared to be due to incomplete alkali removal from the porous $MnO_2$ electrode during immersion of the electrode in water as indicated in Table VII.

TABLE VI

| POLARIZATION TESTS OF $PbO_2$ ELECTRODES | |
|---|---|
| Current Density (mA/cm²) | Polarization ($I^2R$ free) (mV) |
| 1 | 13 | 233 |
| 2 | 7.8 | 0 |
| 3 | 2.6 | 0 |
| 4 | 1.3 | 1 |
| 4 | 13 | 25 |
| 4 | 130 | 223 |

TABLE VII

| EFFECT OF ELECTRODE TYPE ON VOLTAGE | | | |
|---|---|---|---|
| Item | Electrodes | Open Circuit Terminal Cell Voltage (Volts)[4] | Membrane Type |
| 1 | Hydrogen fuel cell[1] | 0.631 | Nafion |
| 2 | Lead dioxide - lead sulfate[2] | 0.631 | Salt bridge |
| 3 | Manganese dioxide[3] | 0.462 | Salt bridge |

[1]Silver-palladium hydrogen electrodes
[2]Lead acid battery electrodes obtained from Faradane Corp.
[3]$MnO_2$ electrode taken from alkaline D cell, Union Carbide Corp. and soaked in water to remove alkali
[4]Measured at 23° C.
[5]The salt bridge is equivalent to a microporous membrane separator.

As can be seen from the data in Table VII, items 1 and 2, the ammonia-borate ester system using hydrogen fuel cell electrodes gave an identical voltage to three significant figures as the same system using lead dioxide electrodes. Thus, the voltage output of the present system is insensitive to the type of hydrogen-ion reacting electrode used. In addition, it is expected that the voltages indicated herein for various systems in accordance with the present invention using hydrogen electrodes would be essentially the same if lead dioxide electrodes were used.

EXAMPLE 8

This example presents experimental results obtained using various acid-base systems in accordance with the present invention in an open loop system. The test results are summarized in Table VIII. In these open loop tests, the mixture indicated in Table VIII was placed in a distillation apparatus containing a vigreaux column. The mixture was distilled until the temperature indicated in Table VIII was reached. The distillate was then poured into one side of an electrochemical cell, the bottoms fraction was poured into the other side, and the resulting voltage was measured at room temperature. The cell electrodes were silver-palladium, and the membrane was Nafion. From the data indicated in Table VIII, it can be seen that very high voltages were obtained for the acetic acid/triethanolamine system using water and sulfolane as solvents. It is expected that similar voltages can be obtained in a closed loop system under identical conditions.

TABLE VIII

OPEN LOOP PERFORMANCE

| Working Fluid | Concentration (Moles) | Boiler Temp. (°C.) | Condenser Temp.(°C.) | Open Circuit Voltage (Volts) |
|---|---|---|---|---|
| $H_3PO_4$ 85% | 1 | 200 | 25 | 0.110 |
| Pyridine | 1 | | | |
| $CF_3SO_3H$ | 1 | 174 | 25 | 0.259 |
| Pyridine | 1 | | | |
| $H_2O$ | 4 | | | |
| $Et(OH)_2$ | 3.6 | | | |
| $C_6H_5COOH$ | 1 | 116 | 25 | 0.315 |
| $NH_3$ | 1 | | | |
| $H_2O$ | 10 | | | |
| $Et(OH)_2$ | 15 | | | |
| $H_3BO_3$ | 1 | 84 | 0 | 0.183 |
| $NH(Et)_2$ | 1 | | | |
| $Et(OH)_2$ | 3 | | | |
| $CH_3COOH$* | 1 | 154 | 25 | 0.747 |
| $N(EtOH)_3$ | 1 | | | |
| $H_2O$ | 0.5 | | | |
| Sulfolane | 1 | | | |
| $CH_3COOH$ | 1 | 154 | 25 | 0.321 |
| $N(EtOH)_3$ | 1 | | | |
| $H_2O$ | 1 | | | |
| $Et(OH)_2$ | 1.6 | | | |

*Microporous membrane in cell

The highest voltage (0.747) indicated in Table VII is probably independent of the use of a microporous or anion membrane. As can be seen in Table VIII, substitution of ethylene glycol for sulfolane lowered the voltage to 0.321 volt. In this case, beneficial results were obtained by using both a hydrogen-bonding and a non-hydrogen-bonding solvent.

Although the present system has been described for a single cell, it should be noted that a complete system would preferably consist of many electrodes stacked and manifolded in series or parallel arrangements for either high voltage or high current applications. This modular design of the system would allow it to be readily modified to either large or small energy systems. In such a stacked structure, any hydrogen gas generated at, for example, a porous carbon hydrogen cathode of a first electrochemical cell is transferred through the back side of the electrode to the back of an identical electrode in the anode compartment of a second electrochemical cell for consumption at the second anode during generation of the electrical current. The hydrogen gas generated in the second cell is transferred to the third cell, and so forth through the series of cells. The solution flow channels through the anode and cathode compartments are kept at minimum thickness and the solution resistances are kept to a minimum in order to minimize cell IR drop. In the embodiment of the present invention in which a gas-liquid electrode is used in a stacked structure, the hydrogen is transferred within the cell and the solutions flow over the back side of the electrodes. Thus, cell IR drops are even lower in this embodiment.

The above-described system utilizes a thermoelectrochemical cycle which converts heat directly to electricity without the requirement of intermediate conversion to mechanical energy. The system is particularly useful for low-temperature applications. In addition, the working fluids can be stored in order to provide electric power during periods when heat is not available. The system has the advantages of no moving parts except for several very small pumps needed to circulate solutions through the system. The materials and solutions used in the system are conventional, low cost materials which are widely available. In addition, due to the fact that many non-corrosive solutions may be used in practising the present invention, the materials used for constructing such systems may be chosen from a variety of readily available, conventionally used materials, such as, graphite, steel, stainless steel, nickel alloys, aluminum, polypropylene, polycarbonate, teflon, and other organic polymers. Of course, if a strong acid or strong base which is corrosive is used in the present invention, materials which are resistant to such chemicals must be used in constructing the apparatus for practising the present invention.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. A thermoelectrochemical system for generating a continuous electrical current from a heat input at a predetermined temperature below about 250° C., comprising:
   (a) an electrochemical cell having a cathode compartment and an anode compartment, said compartments having a common ion permeable separation wall;
   (b) a hydrogen ion reacting cathode and a hydrogen ion reacting anode located within said cathode and anode compartments, respectively, said cathode and anode being connectable externally of said cell for generation of said electrical current therebetween;
   (c) a cathode fluid comprising a chosen Bronsted acid, located in said cathode compartment and in contact with said cathode wherein hydrogen gas or water is generated or collected, and said acid is consumed during generation of said electrical current;
   (d) an anode fluid comprising a chosen Bronsted base, located in said anode compartment and in contact with said anode, wherein:
      (1) a cation of said base is generated and said base and hydrogen or water are consumed at said anode during generation of said electrical current;
      (2) said cation of said base and said anion of said acid combine to form a salt which can be thermally decomposed at said temperature below about 250° C. to form said acid as a first decomposition product and said base as a second decomposition product, which can be separated to regenerate said acid and said base; and (3) at least one of said acid or said base comprises an organic material;

(e) thermal regenerator means for thermally converting said salt comprising said cation of said base and said anion of said acid directly to said acid and said base at said temperature below about 250° C.;

(f) means for transferring said fluid containing said salt from said anode or cathode compartment to said thermal regenerator;

(g) anode recycle means for transferring said base formed in said thermal regenerator back to said anode compartment to replenish said base consumed during generation of said electrical current;

(h) cathode recycle means for transferring said acid formed in said thermal regenerator back to said cathode compartment to replenish said acid consumed during generation of said electrical current.

2. A thermoelectrochemical system as set forth in claim 1 further including means for transferring said hydrogen gas generated at said cathode to said anode compartment for consumption at said anode during generation of said electrical current.

3. A thermoelectrochemical system as set forth in claim 1 wherein said acid is selected from the group consisting of acetic acid, methylsulfonic acid, trifluoromethylsulfonic acid, benzoic acid, hydrochloric acid, phosphoric acid, and the ester of boric acid and ethylene glycol.

4. A thermoelectrochemical system as set forth in claim 1, wherein said base is selected from the group consisting of pyridine, monoethanolamine, triethanolamine, diethylamine, aniline, and ammonia.

5. A thermoelectrochemical system as set forth in claim 1 wherein said cathode fluid further comprises a chosen solvent.

6. A thermoelectrochemical system as set forth in claim 1 wherein said anode fluid further comprises a chosen solvent.

7. A thermoelectrochemical system as set forth in claim 5 or 6 wherein said solvent is selected from the group consisting of ethylene glycol, sulfolane, methanol, acetone, dimethylsulfoxide, and water.

8. A thermoelectrochemical system as set forth in claim 1 wherein said acid and said base comprise organic materials.

9. A thermoelectrochemical system as set forth in claim 1 wherein said acid comprises an organic material and said base comprises an inorganic material.

10. A thermoelectrochemical system as set forth in claim 1 wherein said acid comprises an inorganic material and said base comprises an organic material.

11. A thermoelectrochemical system as set forth in claim 1 wherein said hydrogen ion reacting cathode and anode are selected from the group consisting of a hydrogen electrode and a metal oxide electrode.

12. A thermoelectrochemical system as set forth in claim 1 wherein said electrode comprises a solid polymer electrolyte electrode.

13. A thermoelectrochemical system as set forth in claim 1 wherein:

(a) said cathode comprises a metal oxide electrode;

(b) the anion of said acid forms a soluble salt with the metal ion from said metal oxide; and (c) said cathode fluid further comprises a chosen electrolyte salt and the anion of said electrolyte salt forms an insoluble salt with said metal ion.

14. A thermoelectrochemical system as set forth in claim 1 wherein:

(a) said cathode comprises a metal oxide electrode; and (b) the anion of said acid forms an insoluble salt with the metal ion from said metal oxide.

15. A thermoelectrochemical system as set forth in claim 1 wherein:

(a) said cathode and said anode comprise metal oxide electrodes; and (b) said system further comprises means for interchanging the flow of said anode fluid and said cathode fluid through said anode and cathode compartments.

16. A thermoelectrochemical system as set forth in claim 1 wherein said first decomposition product is a first liquid and said second decomposition product is a gas which can be condensed to a second liquid at a second predetermined temperature, and said system further comprises means for condensing said gas.

17. A thermoelectrochemical system as set forth in claim 16 further including means for transferring heat from said decomposition products to said fluid containing said salt prior to said transferring of said fluid to said thermal regenerator.

18. A thermoelectrochemical system as set forth in claim 1 wherein said heat input is provided to said thermal regenerator means and comprises waste heat produced by a second system external to said thermoelectrochemical system.

19. A thermoelectrochemical system as set forth in claim 18 wherein said second system comprises an internal combustion engine.

20. A thermoelectrochemical system as set forth in claim 18 wherein said second system comprises an oil well head.

21. A thermoelectrochemical system as set forth in claim 1 wherein:

(a) said acid comprises methylsulfonic acid; and (b) said base comprises pyridine.

22. A thermoelectrochemical system as set forth in claim 1 wherein:

(a) said acid comprises the ester of boric acid and ethylene glycol; and (b) said base comprises ammonia.

23. A thermoelectrochemical system as set forth in claim 1 wherein:

(a) said acid comprises hydrochloric acid; and (b) said base comprises pyridine.

24. A thermoelectrochemical system as set forth in claim 1 wherein:

(a) said acid comprises acetic acid; and (b) said base comprises triethanolamine.

25. A thermoelectrochemical system as set forth in claim 1 wherein a multiplicity of said electrochemical cells are connected in series.

26. A thermoelectrochemical system as set forth in claim 25 further comprising means for transferring said hydrogen gas generated at said cathode of a first said cell to said anode compartment of a second said cell.

27. A thermoelectrochemical system as set forth in claim 1 wherein:

(a) said anode fluid comprises a gaseous base;

(b) said cathode fluid comprises a liquid acid; and (c) said anode and cathode comprise a gas-liquid electrode system.

28. A thermoelectrochemical system as set forth in claim 27 wherein said gas-liquid electrode system comprises two hydrogen electrodes bonded to said ion permeable separation membrane.

29. A thermoelectrochemical system as set forth in claim 28 wherein said hydrogen electrodes comprise solid polymer electrolyte electrodes.

30. A thermoelectrochemical system as set forth in claim 28 wherein:
(a) said anode comprises a gas fuel cell electrode; and
(b) said cathode comprises platinum black.

31. A thermoelectrochemical system as set forth in claim 27 wherein:
(a) said anode fluid comprises a mixture of ammonia, hydrogen and water vapor; and
said cathode fluid comprises water and methanesulfonic acid.

32. A thermoelectrochemical system as set forth in claim 1 further including storage tanks to separately store said acid and said base formed in said thermal regenerator means.

33. thermoelectrochemical system as set forth in claim 1 further including storage tanks to separately store said cathode fluid and said anode fluid after reaction in said electrochemical cell and prior to transfer to said thermal regenerator means.

34. thermoelectrochemical system as set forth in claim 1 wherein the pressure within said electrochemical cell is greater than the pressure within the portion of said system which is external to said electrochemical cell.

35. A Method for generating a continuous electrical current between an anode and a cathode from a heat input at a predetermined temperature below about 250° C. comprising the steps of:
(a) contacting a hydrogen ion reacting cathode with a cathode fluid comprising a chosen Bronsted acid, said cathode and cathode fluid being located in a cathode compartment, said cathode compartment having an ion permeable separation wall in common with an anode compartment;
(b) contacting a hydrogen ion reacting anode with an anode fluid in said anode compartment, said anode fluid comprising a chosen Bronsted base, wherein at least one of said acid or said base comprises an organic material, said cathode and anode being externally connectable for generation of said electrical current therebetween, and wherein:
(1) hydrogen gas or water is generated or collected and said acid is consumed at said cathode during generation of said electrical current, and said base and hydrogen gas or water are consumed and a cation of said base is generated at said anode during generation of said electrical current; and
(2) the anion of said acid or said cation of said base diffuses through said separation wall into said anode compartment or said cathode compartment, and said anion and said cation subsequently combine to form the salt thereof;
(c) removing the fluid containing said salt from said anode compartment or said cathode compartment;
(d) thermally converting said salt in the removed fluid directly to said acid and said base at said temperature below about 250° C.;
(e) transferring the thermally generated base to said anode compartment to replenish said base consumed during generation of said electrical current; and (f) transferring the thermally generated acid to said cathode compartment to replenish said acid consumed during generation of said electrical current.

36. A method as set forth in claim 35 wherein:
(a) said separation wall comprises a cation exchange membrane;
(b) said cation of said base migrates through said membrane from said anode compartment to said cathode compartment; and
(c) said salt forms in said cathode compartment.

37. A method as set forth in claim 35 wherein:
(a) said separation wall comprises an anion exchange membrane;
(b) said anion of said acid migrates through said membrane from said cathode compartment to said anode compartment; and
(c) said salt forms in said anode compartment.

38. A method as set forth in claim 35 wherein:
(a) said separation wall comprises a microporous membrane;
(b) said anion of said acid migrates through said membrane into said anode compartment and said cation of said base migrates through said membrane into said cathode compartment; and
(c) said salt forms in both said anode compartment and said cathode compartment.

39. A method as set forth in claim 35 wherein said hydrogen gas generated at said cathode is transferred from said cathode compartment to said anode compartment for reaction at said anode.

40. A method as set forth in claim 35 wherein said salt is thermally converted to a liquid said acid and a gaseous said base and said method further comprises condensing said gaseous said base.

41. A method as set forth in claim 35 wherein said heat input below about 250° C. comprises waste heat produced by a second method separate from said method for generating said continuous electrical current.

42. A method as set forth in claim 35 wherein:
(a') in step (b)(2) the anion of said acid diffuses through said separation wall into said anode compartment and the cation of said base diffuses through said separation wall into said cathode compartment; and
(b') in step (c) said fluid containing said salt is removed from both said anode compartment and said cathode compartment.

43. A thermoelectrochemical system as set forth in claim 28 which further comprises:
(a) first and second current collectors each having a first and second surface wherein each said first surface of said first and second current collectors contacts, respectively, said anode and said cathode, and each said second surface of said first and second current collectors contacts respectively said anode compartment and said cathode compartment; and
(b) cooling means in contact with said anode and cathode compartments, for removing heat produced during generation of said electrical current.

44. A thermoelectrochemical system as set forth in claim 43 further comprising means for transferring a second gaseous product fromed in said anode or cathode compartment during said electrochemical reaction to said cathode or anode compartment, respectively.

* * * * *

UNITED STATES PATENT AND TRADEMARK OFFICE
CERTIFICATE OF CORRECTION

PATENT NO. : 4,738,904

DATED : Apr. 19, 1988

INVENTOR(S) : Ludwig et al

Page 1 of 2

It is certified that error appears in the above—identified patent and that said Letters Patent is hereby corrected as shown below:

Col. 3, line 28, after "base" insert --,-- (a comma).

Col. 6, line 7, Equation (2), after "$MY_2(s)$ +" add
$$--2H_2O + L^{++} + 2X^- \qquad (2)--.$$

Col. 6, line 26, Equation (3), delete "4H" and insert therefor $--4H^+--$.

After "$2e^-$", delete "$\rightarrow MX_2(s)$" and insert therefor $--\rightarrow MX_2(s)--$.

Col. 7, line 18, Equation (6), delete "2X" and insert therefor $--2X^---$.

Line 19, delete "$^-$" (first occurrence).

Col. 7, line 47, Equation (7), delete "$X^-H^+$" and insert therefor $--X^- + H^+--$.

Col. 7, line 54, delete "$BH^{+X-}$" and insert therefor $--BH^+X^---$.

Col. 8, line 2, delete "$BH^{+X-}$" and insert therefor $--BH^+X^---$.

Col. 11, line 20, Equation (9), delete "U-L/U" and insert therefor --(U-L/U)--.

Col. 27, line 14, (Claim 31), before "said" insert --(b)--.

Col. 27, line 20, (Claim 33), before "thermoelectrochemical" Insert --A--.

UNITED STATES PATENT AND TRADEMARK OFFICE
CERTIFICATE OF CORRECTION

PATENT NO. : 4,738,904

DATED : Apr. 19, 1988

INVENTOR(S) : Ludwig et al

It is certified that error appears in the above—identified patent and that said Letters Patent is hereby corrected as shown below:

Col. 27, line 25, (Claim 34), before "thermoelectrochemical" insert --A--.

Col. 28, line 64, (Claim 44), delete "fromed" and insert therefor --formed--.

Signed and Sealed this

Twenty-seventh Day of December, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,738,904
DATED : Apr. 19, 1988
INVENTOR(S) : Ludwig et al

It is certified that error appears in the above—identified patent and that said Letters Patent is hereby corrected as shown below:

Col. 3, line 28, after "base" insert --,-- (a comma).

Col. 6, line 7, Equation (2), after "$MY_2(s) +$" add
$$--2H_2O + L^{++} + 2X^- \qquad (2)--.$$

Col. 6, line 26, Equation (3), delete "4H" and insert therefor --$4H^+$--.
After "$2e^-$", delete "$\rightarrow MX_2(s)$" and insert therefor --$\rightarrow MX_2(s)$--.

Col. 7, line 18, Equation (6), delete "2X" and insert therefor --$2X^-$--.
Line 19, delete "$^-$" (first occurrence).

Col. 7, line 47, Equation (7), delete "$X^-H^+$" and insert therefor --$X^- + H^+$--.

Col. 7, line 54, delete "$BH^{+X-}$" and insert therefor --$BH^+X^-$--.

Col. 8, line 2, delete "$BH^{+X-}$" and insert therefor --$BH^+X^-$--.

Col. 11, line 20, Equation (9), delete "U-L/U" and insert therefor --(U-L)/U--.

Col. 27, line 14, (Claim 31), before "said" insert --(b)--.

Col. 27, line 20, (Claim 33), before "thermoelectrochemical" Insert --A--.

UNITED STATES PATENT AND TRADEMARK OFFICE
CERTIFICATE OF CORRECTION

PATENT NO. : 4,738,904
DATED : Apr. 19, 1988
INVENTOR(S) : Ludwig et al

It is certified that error appears in the above—identified patent and that said Letters Patent is hereby corrected as shown below:

Col. 27, line 25, (Claim 34), before "thermoelectrochemical" insert --A--.

Col. 28, line 64, (Claim 44), delete "fromed" and insert therefor --formed--.

This Certificate supersedes Certificate of Correction issued December 27, 1988

Signed and Sealed this

Seventh Day of March, 1989.

Attest:

DONALD J. QUIGG

Attesting Officer

Commissioner of Patents and Trademarks